(12) United States Patent
Dunning et al.

(10) Patent No.: US 11,401,043 B2
(45) Date of Patent: Aug. 2, 2022

(54) SYSTEMS AND METHODS FOR MOBILE DEVICE ENABLED ROTOR TRACK AND BALANCE

(71) Applicant: GE AVIATION SYSTEMS LIMITED, Gloucestershire (GB)

(72) Inventors: Paul Michael Dunning, Eastleigh (GB); Steven Bonnett, Sandown (GB); Nicholas Keningley, Salisbury (GB); Steven P. Jackson, Eastleigh (GB); Andrew John James Sproule, Southampton (GB)

(73) Assignee: GE Aviation Systems Limited, Gloucestershire (GB)

( * ) Notice: Subject to any disclaimer, the term of this patent is extended or adjusted under 35 U.S.C. 154(b) by 0 days.

(21) Appl. No.: 16/907,647

(22) Filed: Jun. 22, 2020

(65) Prior Publication Data
US 2021/0394920 A1    Dec. 23, 2021

(51) Int. Cl.
*B64D 43/00* (2006.01)
*B64F 5/60* (2017.01)
*H04L 67/125* (2022.01)
*B64D 45/00* (2006.01)

(52) U.S. Cl.
CPC .............. *B64D 43/00* (2013.01); *B64F 5/60* (2017.01); *H04L 67/125* (2013.01); *B64D 2045/0085* (2013.01)

(58) Field of Classification Search
CPC .... B64D 43/00; B64D 47/08; B64D 45/0005; B64D 47/06; B64D 2045/0085; B64F 5/60; H04L 67/125
See application file for complete search history.

(56) References Cited

U.S. PATENT DOCUMENTS

| 7,561,200 | B2 | 7/2009 | Garvey, III et al. |
| 8,190,393 | B2 * | 5/2012 | Moir ............... B64C 27/008 |
| | | | 702/151 |
| 8,261,599 | B2 | 9/2012 | Jeffrey et al. |

(Continued)

FOREIGN PATENT DOCUMENTS

| CN | 105173111 A | 12/2015 |
| RU | 2415053 C1 * | 3/2011 |

OTHER PUBLICATIONS

Extended European Search Report for EP Application No. 21179938.2 dated Nov. 17, 2021 (8 pages).

*Primary Examiner* — Quan Zhen Wang
*Assistant Examiner* — Mancil Littlejohn, Jr.
(74) *Attorney, Agent, or Firm* — Dinsmore & Shohl LLP

(57) ABSTRACT

A handheld mobile device may be configured for use within a cockpit or cabin of an aircraft. The handheld mobile device may include a display and memory that includes an application configured to utilize the display. The handheld mobile device may also include a processor coupled to the memory. The application, via the processor, may be configured to receive aircraft-specific configuration data. The application may also receive, from a tracker module, input data corresponding to blade height and position. The application may additionally receive airframe vibration data from an accelerometer module. The application may further calculate recommendations regarding track and balance. The application may also further output, via the display, the track and balance recommendations.

15 Claims, 10 Drawing Sheets

(56) References Cited

U.S. PATENT DOCUMENTS

| | | | |
|---|---|---|---|
| 8,682,509 B2 | 3/2014 | Goodrich et al. | |
| 8,812,255 B2 | 8/2014 | Lynch et al. | |
| 9,057,682 B2 | 6/2015 | Nakayama et al. | |
| 9,758,243 B1 | 9/2017 | Potts et al. | |
| 9,776,712 B2 | 10/2017 | Jolly et al. | |
| 9,815,565 B1 | 11/2017 | Fox et al. | |
| 9,836,945 B2 | 12/2017 | Kramer et al. | |
| 2007/0260726 A1* | 11/2007 | Rozak | G08G 5/0013 709/224 |
| 2016/0021475 A1 | 1/2016 | Moore et al. | |
| 2016/0223390 A1 | 8/2016 | Lin | |
| 2018/0072405 A1* | 3/2018 | Dock | B64C 27/008 |
| 2018/0261022 A1* | 9/2018 | Bechhoefer | B64D 43/00 |
| 2018/0350165 A1 | 12/2018 | Moravek et al. | |
| 2019/0080524 A1* | 3/2019 | Tucker | G07C 5/0841 |
| 2019/0187011 A1 | 6/2019 | Sipilae et al. | |
| 2021/0331788 A1 | 10/2021 | Moravek et al. | |

\* cited by examiner

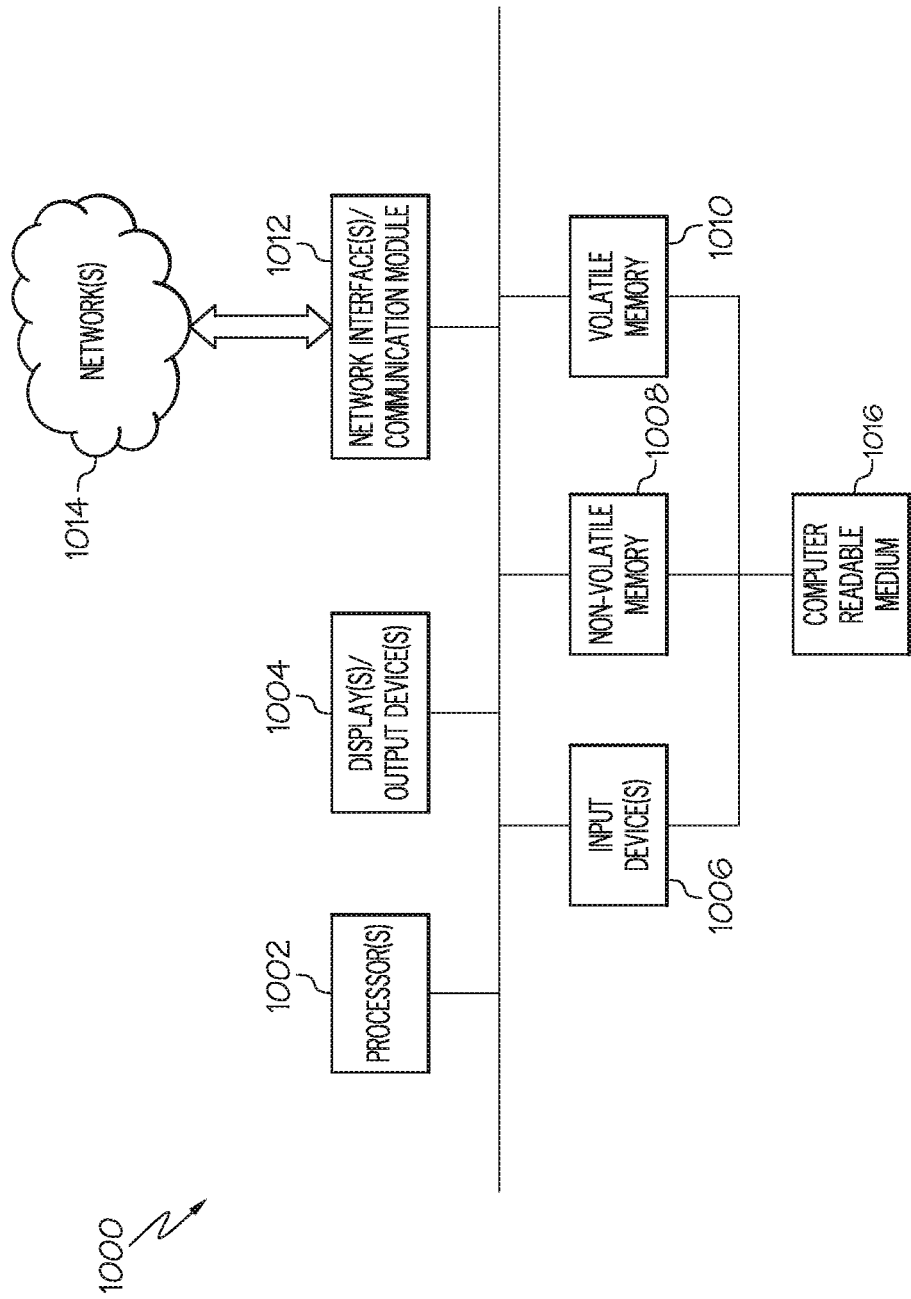

US 11,401,043 B2

SYSTEMS AND METHODS FOR MOBILE DEVICE ENABLED ROTOR TRACK AND BALANCE

TECHNICAL FIELD

The present application generally relates to aircraft maintenance and, more particularly, to calibrating rotor track and balance.

BACKGROUND

Helicopter rotor blades travel around a hub and can change their pitch angle to influence the helicopter's direction of flight, speed and lift. Under ideal conditions, when identical blades are installed to specification and based on a collective setting/configuration, the rotor blade tips all "track" around the hub through the exact same point in space at a given point in the rotation. Blades that are out of balance can transmit a vibration into the rotor head, transmission, airframe, and other helicopter components. Too much vibration can cause excessive wear and failure in components, leading to increased maintenance costs and helicopter downtime. Therefore, periodic maintenance is required to check and correct rotor track and balance.

SUMMARY

A handheld mobile device is configured for use within a cockpit or cabin of an aircraft and includes a display, a memory comprising an application configured to utilize the display, and a processor coupled to the memory. The processor is configured to execute the application to receive the aircraft-specific configuration data. The application also receives, from a tracker module, input data corresponding to blade height and position. The application further receives airframe vibration data from an accelerometer module. The application calculates recommendations regarding track and balance. The application outputs, via the display, the track and balance recommendations.

In another embodiment, a system configured for use within a cockpit or cabin of an aircraft includes a handheld mobile device, a tracker module including a camera, an accelerometer module including an accelerometer, and a configuration service. The handheld mobile device includes a display, a memory comprising an application, and a processor coupled to the memory. The processor is configured to execute the application to receive aircraft-specific configuration data, receive, from a tracker module, input data corresponding to blade height and position, receive airframe vibration data from an accelerometer module, calculate recommendations regarding track and balance, and output, via the display, the track and balance recommendations. The tracker module is configured to utilize the camera to generate input data corresponding to blade height and position, and output the blade track data to the handheld mobile device. The accelerometer module is configured to utilize the accelerometer to generate airframe vibration data, and output the airframe vibration data to the handheld mobile device. The configuration service is configured to output, to the handheld mobile device, the aircraft-specific configuration data.

In yet another embodiment, a method utilizing a handheld mobile device in an aircraft cockpit or cabin includes accessing an application on the handheld mobile device, utilizing the application to download aircraft-specific configuration data, starting data acquisition for a regime, synchronizing vibration and blade acquisitions, acquiring blade and vibration data, storing vibration and blade data for the regime, calculating and storing vibration results for the regime, calculating track and balance recommendations, and displaying vibration results, track recommendations, and balance recommendations on the handheld mobile device.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 10 is a block diagram illustrating computing hardware utilized in one or more devices for implementing various systems and processes, according one or more embodiments shown and described herein.

DETAILED DESCRIPTION

Embodiments of the present disclosure are directed to mobile device enabled rotor track and balance in aircraft that utilize one or more rotors (also referred to herein interchangeably as rotorcraft). More specifically, aircraft-specific configuration data may be compared against other data obtained by observing operations of the aircraft. This may include, for example, airframe vibration data and/or input data corresponding to blade height and position. This comparison may then be utilized to calculate and provide rotor track and balancing recommendations, which may result in reduced rotor induced vibrations. Embodiments that employ tracker modules and accelerometer modules that are physical separate from and in wireless communication with a mobile device may provide significant reduction in installation time and improved user operation as compared to systems in which such modules are hard-wired. Various embodiments of mobile device enabled rotor track and balancing are described in detail below.

Figure 1:
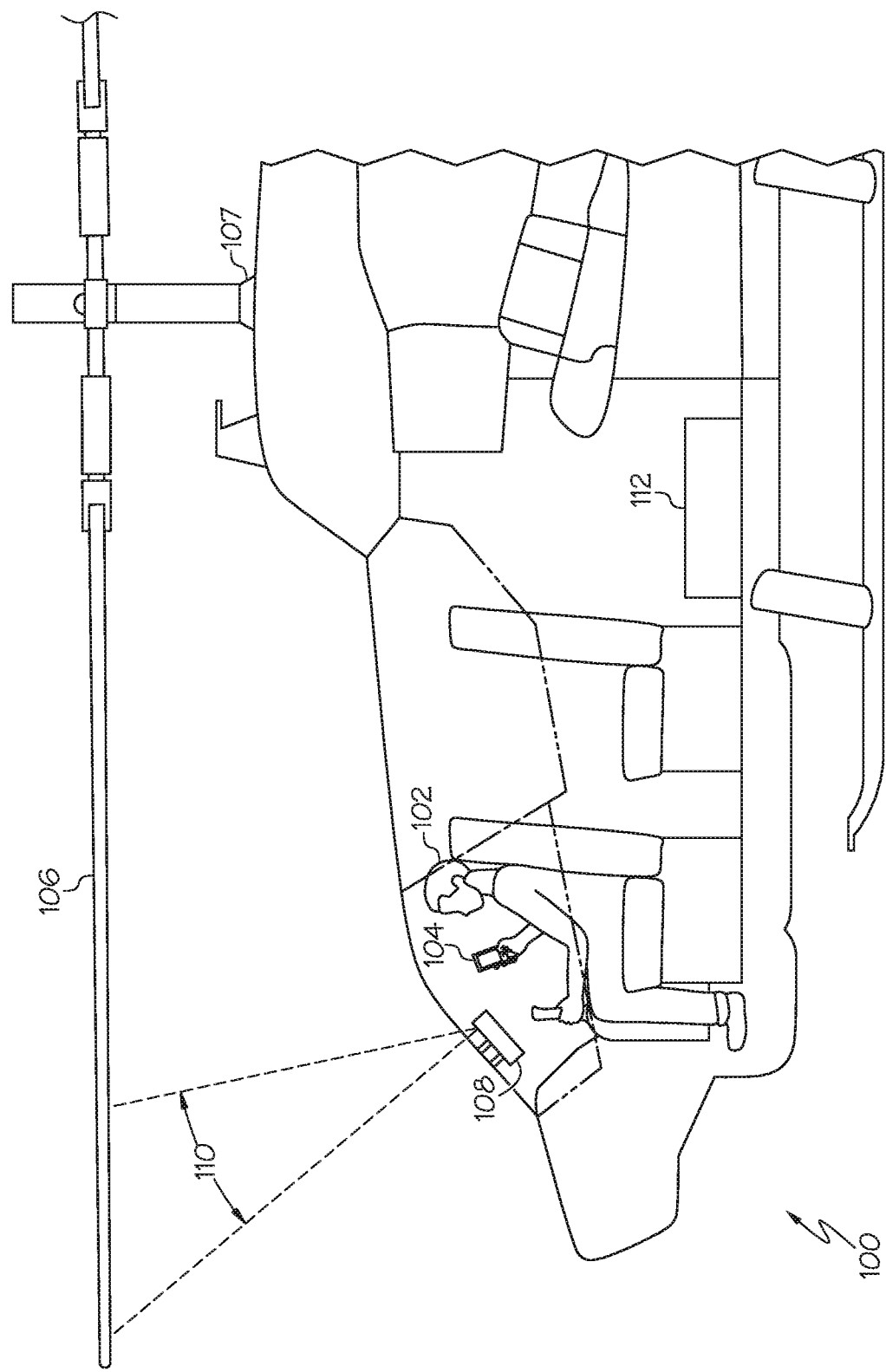
FIG. 1 is a side view of a helicopter featuring a handheld mobile device, tracker module, and accelerometer module for implementing various systems and processes, according one or more embodiments shown and described herein.

Turning to FIG. 1, an aircraft 100 is depicted with an occupant 102 present inside the cockpit and/or cabin. In this embodiment, the aircraft 100 is a helicopter, although any type of aircraft utilizing rotors and/or rotating blades for mobility may be utilized. In this embodiment, the occupant 102 may be a pilot, co-pilot, or anyone else capable of flying the aircraft 100. In other embodiments, the occupant 102 may be a passenger, flight crew member, technician, or anyone else capable of utilizing a handheld mobile device 104 as described herein. The handheld mobile device 104 may be any suitable type of portable electronic device that processes or stores data and is capable of being utilized while worn or held in one or both hands of the operator. In some embodiments, handheld mobile device 104 may refer to the type of device rather than actually being held in a user's hand(s), thus it need not be held by a user but may be mounted or otherwise secured/affixed to any suitable portion of the aircraft. Non-limiting examples of a handheld mobile device 104 may include laptops, tablets, smartphones, servers, client devices, wearable devices, and the like. The handheld mobile device 104 includes a display on which rotor track and balancing recommendations may be displayed, as described below. The aircraft 100 may also have one or more rotors 107 that turn one or more blades 106 to lift the aircraft 100. This ensures that the aircraft 100 can become airborne, while also generating enough thrust to overcome aerodynamic drag encountered in forward flight.

Part of the maintenance routine of aircraft utilizing rotors 107 and blades 106 may include rotor track and balancing (RTB). Rotor tracking may involve the adjustment of the blade tip paths such that they rotate within the same rotational plane. Rotor tracking may be accomplished by any suitable device capable of tracking rotor blades 106. In this embodiment, one or more tracker modules 108 may be utilized to capture one or more tracking views 110 of the blades 106. The tracker module 108 may be a dedicated hardware device utilizing wireless and/or wired connections. For example, input data may be configured to be received wirelessly from one or more cameras of the tracker module 108, where the tracker module 108 is a physical device affixed to a location within the cockpit physically separate from the handheld mobile device.

The tracker module 108 may be attached or adjacent to any transparent surface of the cockpit, such as a windshield, in order to have a clear and unobstructed view of the blades 106. In some embodiments, a tracker may installed (temporarily or permanently) with a view of the blades, such that a tracker bracket may be installed on the aircraft exterior and the tracker may be secured (via bolting or secured by any other suitable fastener types) as RTB is performed. The tracker module 108 may utilize a camera to track blade height and position. Blade "pulses" may be utilized to track individual blades, where one blade may be identified as a reference blade by identifying differences in the blade pulses. The reference blade pulse may also be utilized to determine rotational speed. In some embodiments, the tracker module 108 may be affixed to any suitable surface of the aircraft 100 by any suitable means, such as with a mounting device, via bolting or other fastener(s), an adhesive, and the like. In some embodiments, the tracker module 108 may affixed or otherwise reside upon any suitable surface within or on the exterior of the aircraft. Any suitable positioning, perspective, and/or viewing angle for the tracking view 110 may be utilized. The tracker module 108 may include or otherwise utilize one or more cameras and/or other devices capable of tracking the blades 106. In other embodiments, at least a portion of the tracker module 108 may include software or other components within another device. The tracker module 108 may include communications equipment to communicate (wireless or wired) blade track data to the portable device utilizing any suitable communications mechanisms discussed herein. Rotor balancing may involve the rotational frequency of the rotor 107. Rotor-induced-vibration may be measured for rotor balancing by one or more accelerometer modules 112 utilizing wireless and/or wired connections. An accelerometer module 112 may include or otherwise utilize one or more accelerometers and/or other devices capable of tracking movement/vibration of the airframe of the aircraft 100. The accelerometer module 112 (which may also be referred to as a device accelerometer in some embodiments) may be an accelerator device affixed to a portion of the airframe to detect airframe vibration frequency and/or intensity. The accelerometer module 112 may be affixed to any suitable surface of the aircraft 100 in any suitable manner, such as mounting via a mounting device, via bolts and/or other fastener(s), an adhesive, and the like. For example, airframe vibration data may be received wirelessly from the accelerometer module 112, where the accelerometer module 112 is a physical device affixed to a location within the cockpit physically separate from the handheld mobile device 104. In this embodiment, the tracker module 108 may be physically separate from the accelerometer module 112. In other embodiments, at least a portion of the accelerometer module 112 may include software or a component within another device.

Figure 2:
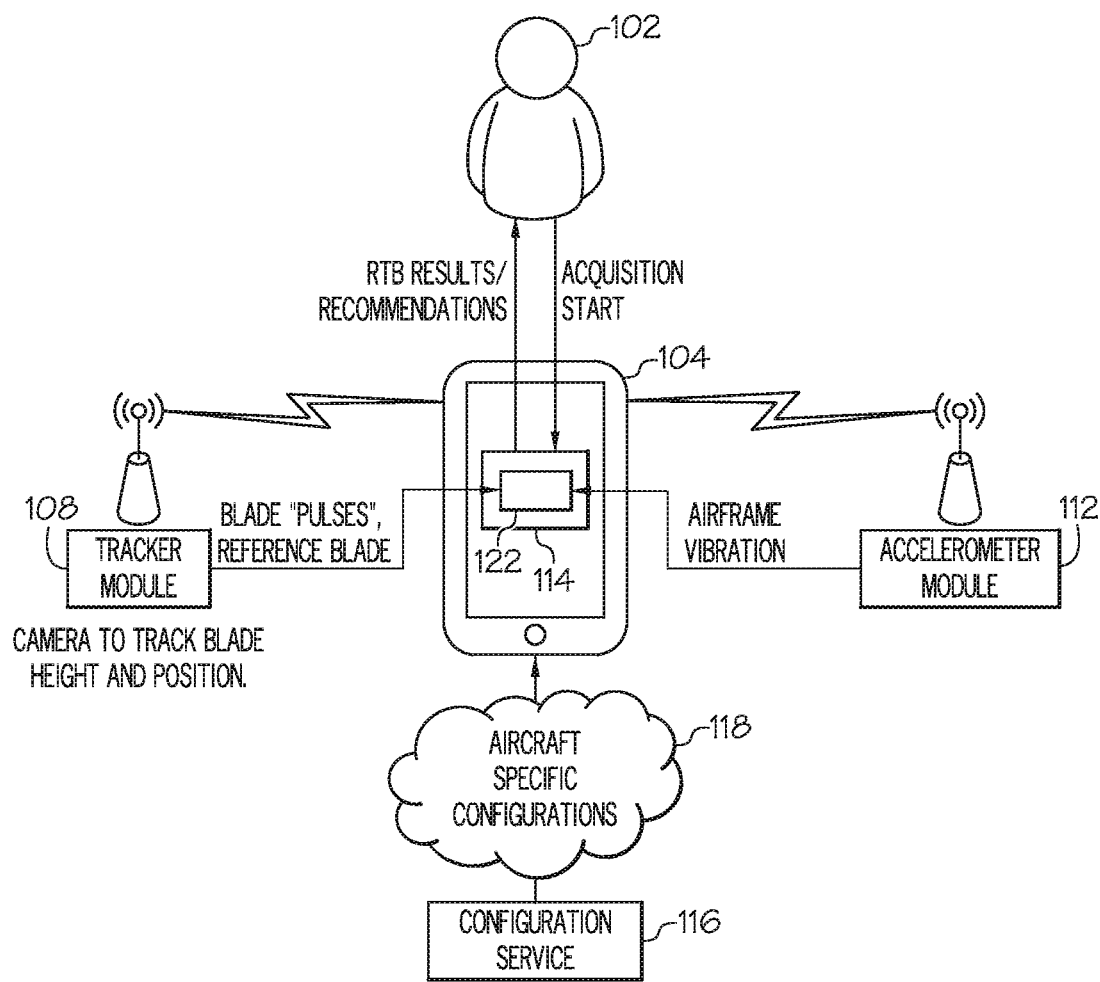
FIG. 2 is a diagram schematically illustrating an exemplary system utilizing a handheld mobile device, tracker module, and accelerometer module for implementing various systems and processes, according one or more embodiments shown and described herein.

Turning to FIG. 2, a schematic view is depicted of a system utilizing a handheld mobile device, a tracker module, and an accelerometer module, which may be utilized in the system of FIG. 1. An occupant 102 may utilize a handheld mobile device 104 to request RTB data pertaining to the aircraft 100 in which the occupant 102 and handheld mobile device 104 are located. As noted above, the tracker module 108 may be affixed to the cockpit windshield and utilize a camera to track blade height and position. In some embodiments, input data may include camera data/imagery. Blade "pulses" may be utilized to track individual blades, where one blade may be designated as a reference blade. The blade pulses may also be utilized to determine rotational speed. The tracker module 108 may wirelessly transmit the track blade height and position data to an RTB solver 122 within an RTB application 114 residing on the handheld mobile device 104. In some embodiments, one or more tachometer modules may be utilized to track blades, either instead of or in combination with the tracking module 108. A tachometer module may be located in any suitable location on or within the aircraft, such as on the rotor mast, to directly measure rotation speed. A tachometer module may be a wireless module or wired into a digital bus (for example).

The accelerometer module 112 may wirelessly transmit the airframe vibration data to the RTB application 114 residing on the handheld mobile device 104. Additionally, an aircraft-specific configuration 118 may be provided by a configuration service 116. The configuration service 116 may utilize any remote type of data service (e.g., cloud-based, web-based, FTP, etc.) and/or local data (e.g., local hard drive, optical media, thumb drive, and the like). The aircraft-specific configuration 118 may include data regarding blade size, blade height, rotor balancing, aircraft type, aircraft model, aircraft weight, and the like. The aircraft-specific configuration 118 data may be requested by the occupant 102 utilizing the RTB application 114 on the handheld mobile device 104 and/or retrieved from the configuration service 116 by the RTB application 114 (e.g., continuously, periodically, in accordance with a user-defined parameter, in response to receiving a request for the same, and the like). In some embodiments, retrieval from the configuration service 116 by the RTB application 114 may utilize one or more parameters configurable by the occupant 102 and/or another user, such as a remote administrator. In other embodiments, the aircraft-specific configuration 118 data may be sent or pushed automatically to the RTB application 114.

The RTB solver 122 may utilize output received from the tracker module 108, the accelerometer module 112, and/or the configuration service 116 to calculate RTB results and/or recommendations. The RTB solver 122 may analyze the processed blade track data (which may include blade imagery in some embodiments) as discussed in more detail below, compare the processed blade track data to the configuration data, vibration data received from the accelerometer module, and/or calculate track and balance recommendations based upon the comparison. Based upon the results provided by the RTB solver 122, the RTB application 114 residing on the handheld mobile device 104 may display RTB results, and/or send RTB results and/or recommendations to the occupant 102, other users, and/or to other remote and/or local devices.

Figure 3:
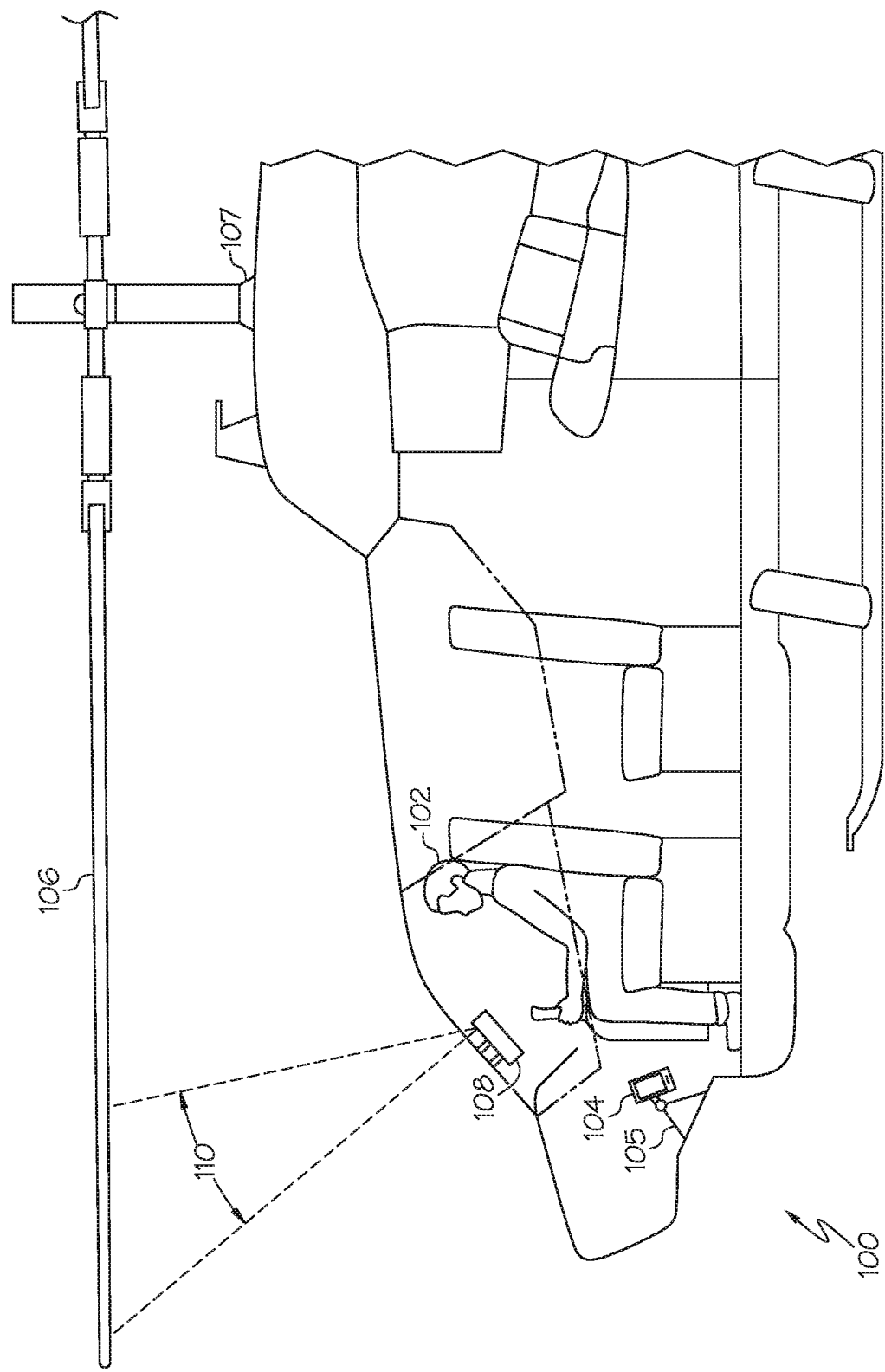
FIG. 3 is a side view of a helicopter featuring a handheld mobile device and tracker module for implementing various systems and processes, according one or more embodiments shown and described herein.

Turning to FIG. 3, another embodiment depicts a side view of a helicopter featuring a handheld mobile device and a tracker module. Here, the occupant 102 operates the aircraft 100 and does not hold the handheld mobile device 104. Instead, a handheld mobile device mount 105 is used to secure the handheld mobile device 104 to the airframe of the aircraft 100. In this embodiment, the handheld mobile device 104 may have one or more accelerometers used to measure rotor-induced-vibration by measuring vibration frequency and/or intensity, in lieu of a separate accelerometer module. Additionally, one or more tracker modules 108 may be utilized to capture a tracking view 110 of the blades 106.

Figure 4:
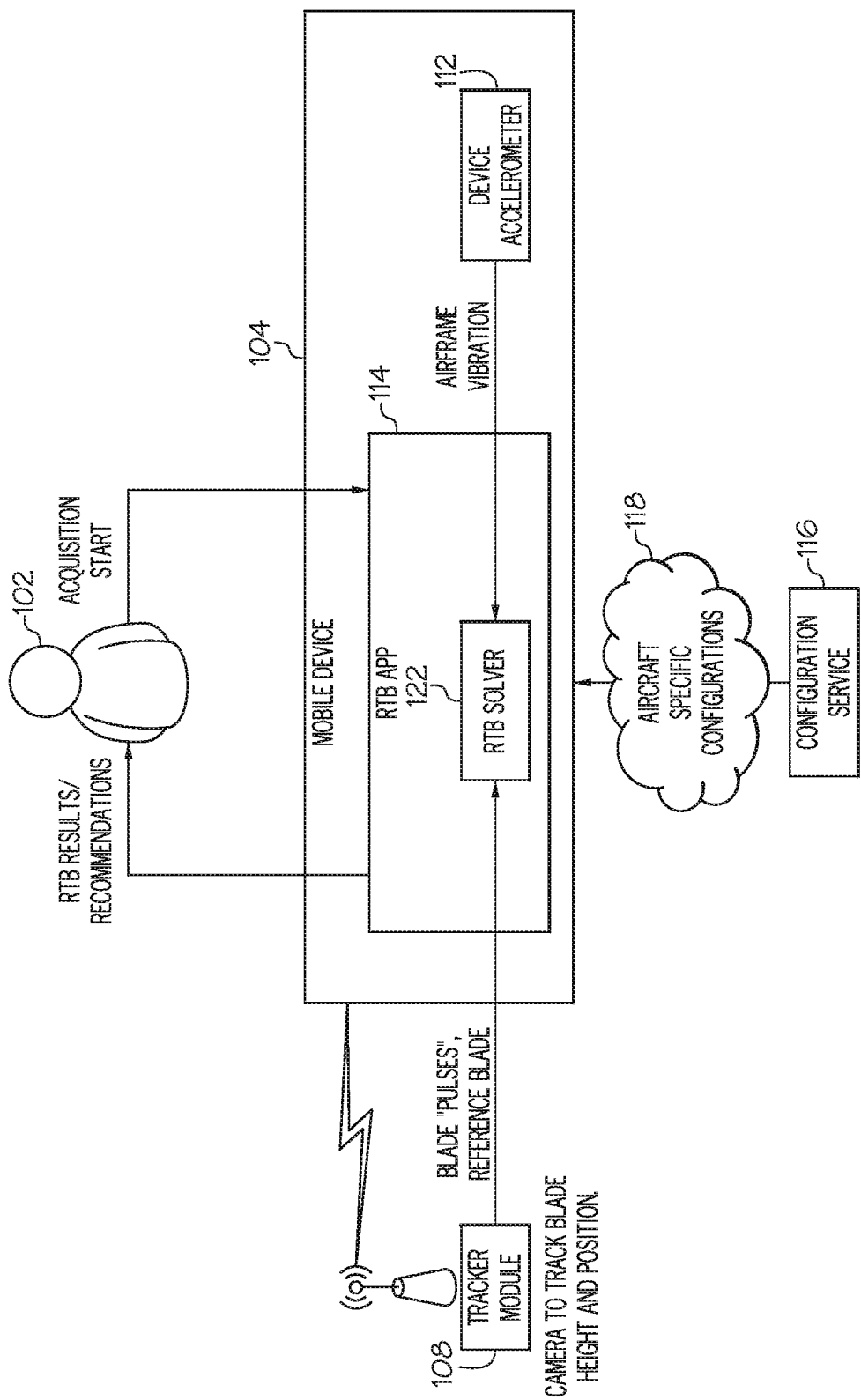
FIG. 4 is a diagram schematically illustrating an exemplary system utilizing a handheld mobile device and tracker module for implementing various systems and processes, according one or more embodiments shown and described herein.

Turning to FIG. 4, a schematic view is depicted of a system utilizing a handheld mobile device and a tracker module, which may be utilized in the embodiment shown in FIG. 3. The occupant 102 may utilize the handheld mobile device 104 to request RTB data pertaining to the aircraft 100. The tracker module 108 may wirelessly transmit the track blade height and position data to an RTB solver 122. The handheld mobile device 104 may utilize its own accelerometer module 112 to detect airframe vibration frequency and/or intensity. The accelerometer module 112 may provide the vibration data to the RTB application 114 internally within the handheld mobile device 104. The configuration service 116 may provide aircraft-specific configuration 118 to the handheld mobile device 104, the RTB application 114, and/or the RTB solver 122. The RTB solver 122 may utilize output received from the tracker module 108, the accelerometer module 112, and/or the configuration service 116 to calculate RTB results and/or determine RTB recommendations. Based upon the results provided by the RTB solver 122, the RTB application 114 residing on the handheld mobile device 104 may send RTB results and/or recommendations to the occupant 102, such as by displaying such recommendations on a display of the handheld mobile device 104.

Figure 5:
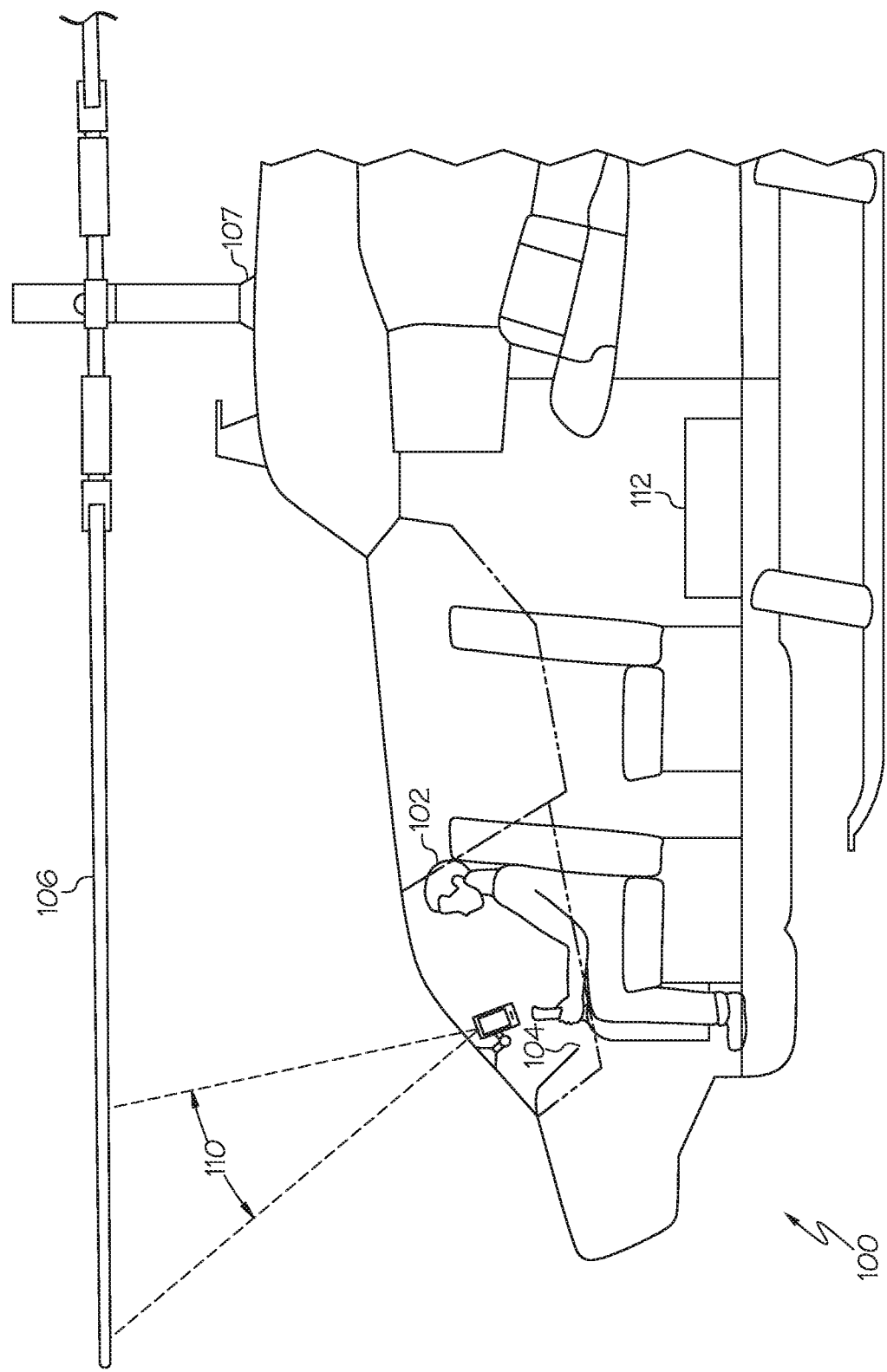
FIG. 5 is a side view of a helicopter featuring a handheld mobile device and accelerometer module for implementing various systems and processes, according one or more embodiments shown and described herein.

Turning to FIG. 5, a further embodiment depicts a side view of a helicopter featuring a handheld mobile device and an accelerometer module. Here, the occupant 102 operates the aircraft 100 and does not hold the handheld mobile device 104. Instead, the handheld mobile device 104 is affixed to the cockpit windshield in order to obtain a tracking view 110 for tracking blade height and position. In this embodiment, the handheld mobile device 104 may have one or more device cameras 109 (see FIG. 6), in lieu of the tracker module. Additionally, one or more accelerometer modules 112 may be affixed to any suitable surface of the aircraft 100 in any suitable manner to measure rotor-induced-vibration.

Figure 6:
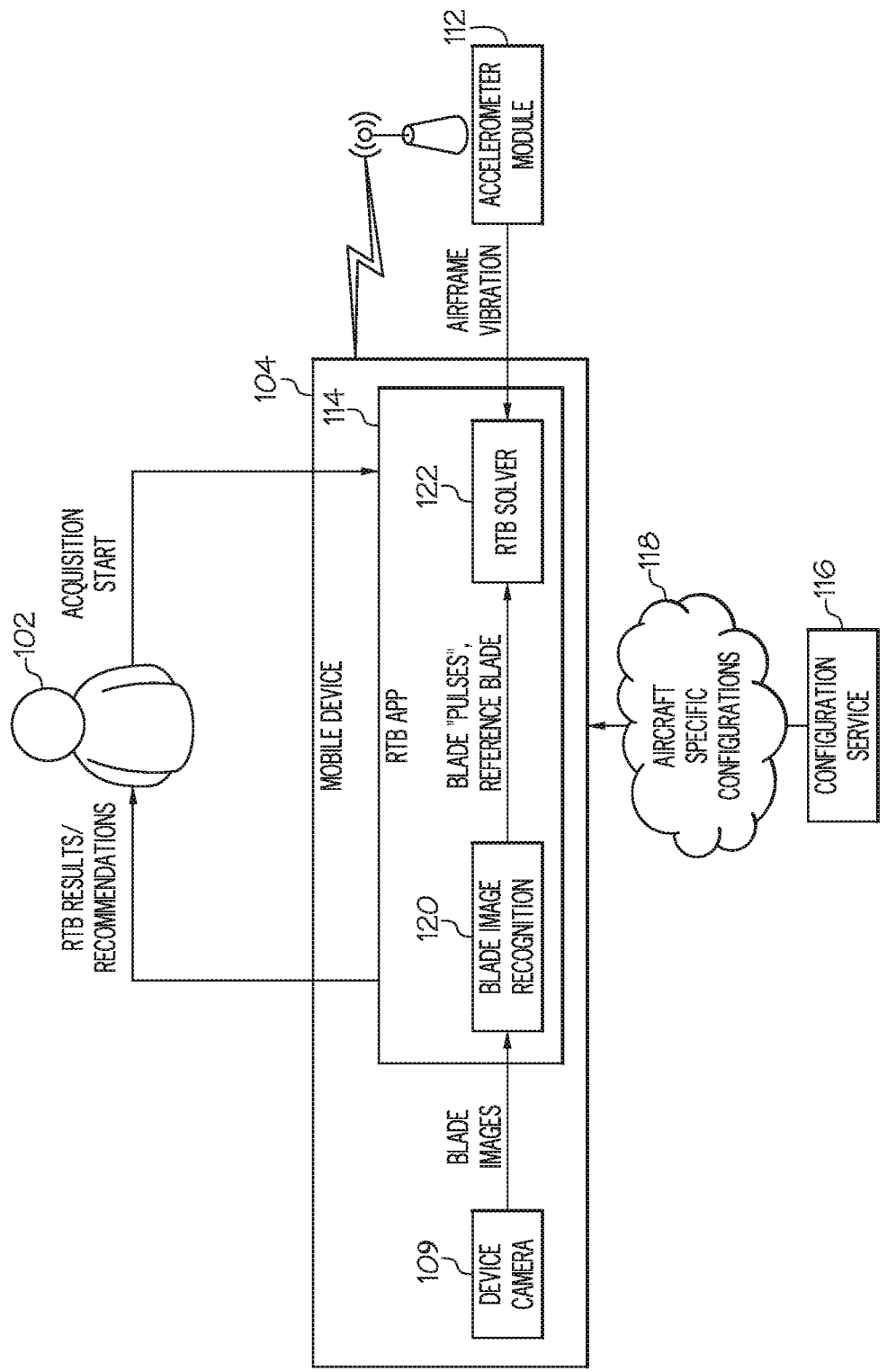
FIG. 6 is a diagram schematically illustrating an exemplary system utilizing a handheld mobile device and accelerometer module for implementing various systems and processes, according one or more embodiments shown and described herein.

Turning to FIG. 6, a schematic view is depicted of a system utilizing a handheld mobile device and an accelerometer module, which may be employed by the embodiment of FIG. 5. The occupant 102 may utilize the handheld mobile device 104 to request RTB data pertaining to the aircraft. The accelerometer module 112 may wirelessly transmit the airframe vibration data to the RTB application 114 residing on the handheld mobile device 104. The handheld mobile device 104 may utilize its own device camera 109 to track raw blade height and position data. The device camera 109 may provide the raw blade height and position data to a blade image recognition program 120 within the RTB application 114. The blade image recognition program 120 may utilize any suitable image processing/recognition techniques to track one or more of the blades. The blade image recognition program 120 may then output/transmit, within the RTB application 114, the blade pulse and reference blade data to the RTB solver. The configuration service 116 may provide aircraft-specific configuration 118 to the handheld mobile device 104, the RTB application 114, and/or the RTB solver. The RTB solver 122 may utilize output received from the tracker module 108, the accelerometer module 112, and/or the configuration service 116 to calculate RTB results and/or provide RTB recommendations. Based upon the results provided by the RTB solver 122, the RTB application 114 may send and/or display RTB results and/or RTB recommendations to the occupant 102.

Figure 7:
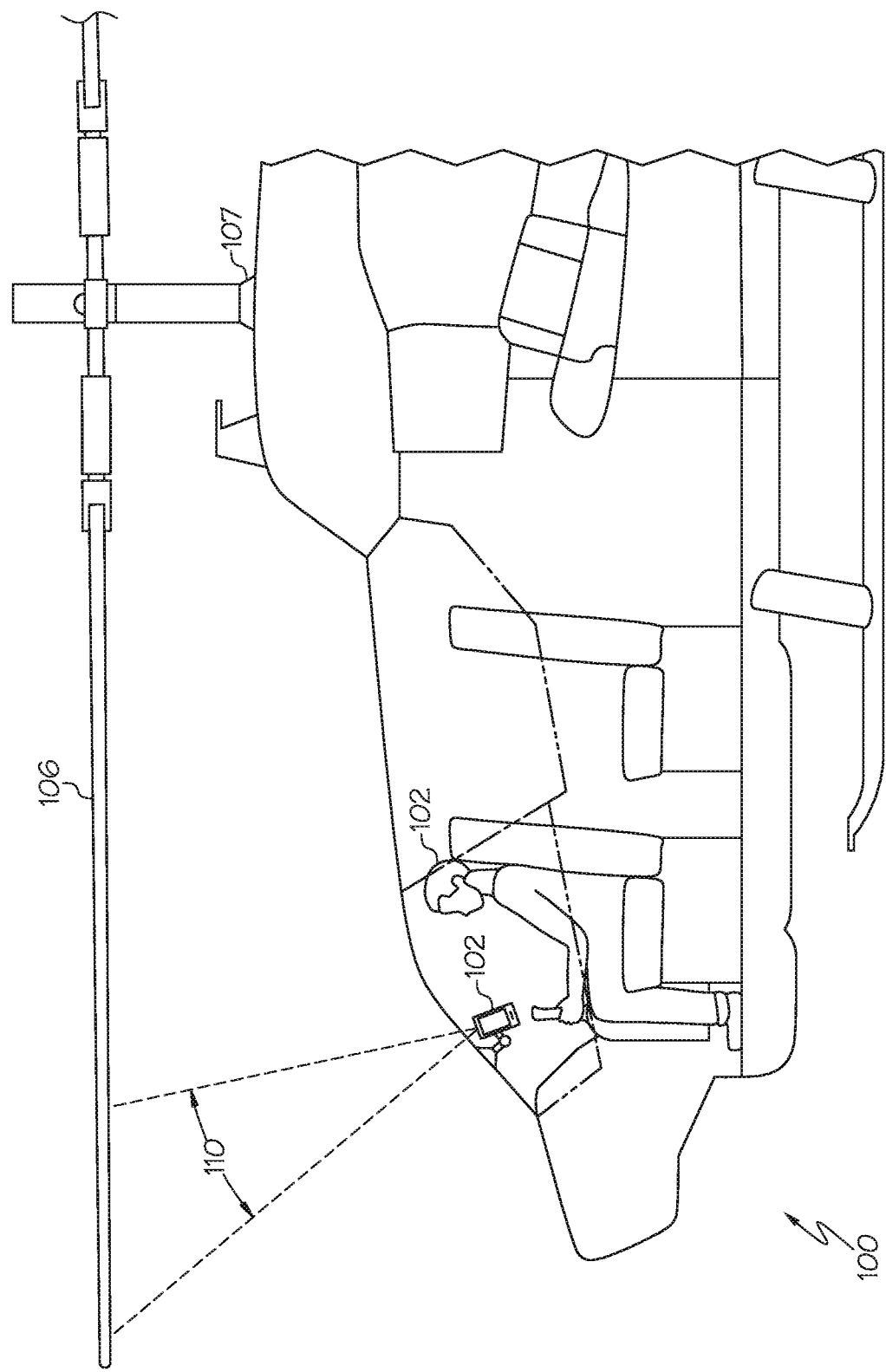
FIG. 7 is a side view of a helicopter featuring a handheld mobile device for implementing various systems and processes, according one or more embodiments shown and described herein.

Turning to FIG. 7, a different embodiment depicts a side view of a helicopter featuring a handheld mobile device. The occupant 102 operates the aircraft 100 without holding the handheld mobile device 104. Instead, a handheld mobile device mount 105 secures the handheld mobile device 104 to the airframe of the aircraft 100. In this embodiment, the handheld mobile device 104 may have one or more accelerometers used to monitor rotor-induced-vibration by measuring vibration frequency and/or intensity, in lieu of the accelerometer module. The handheld mobile device 104 may also have one or more device cameras 109, in lieu of a tracker module.

Figure 8:
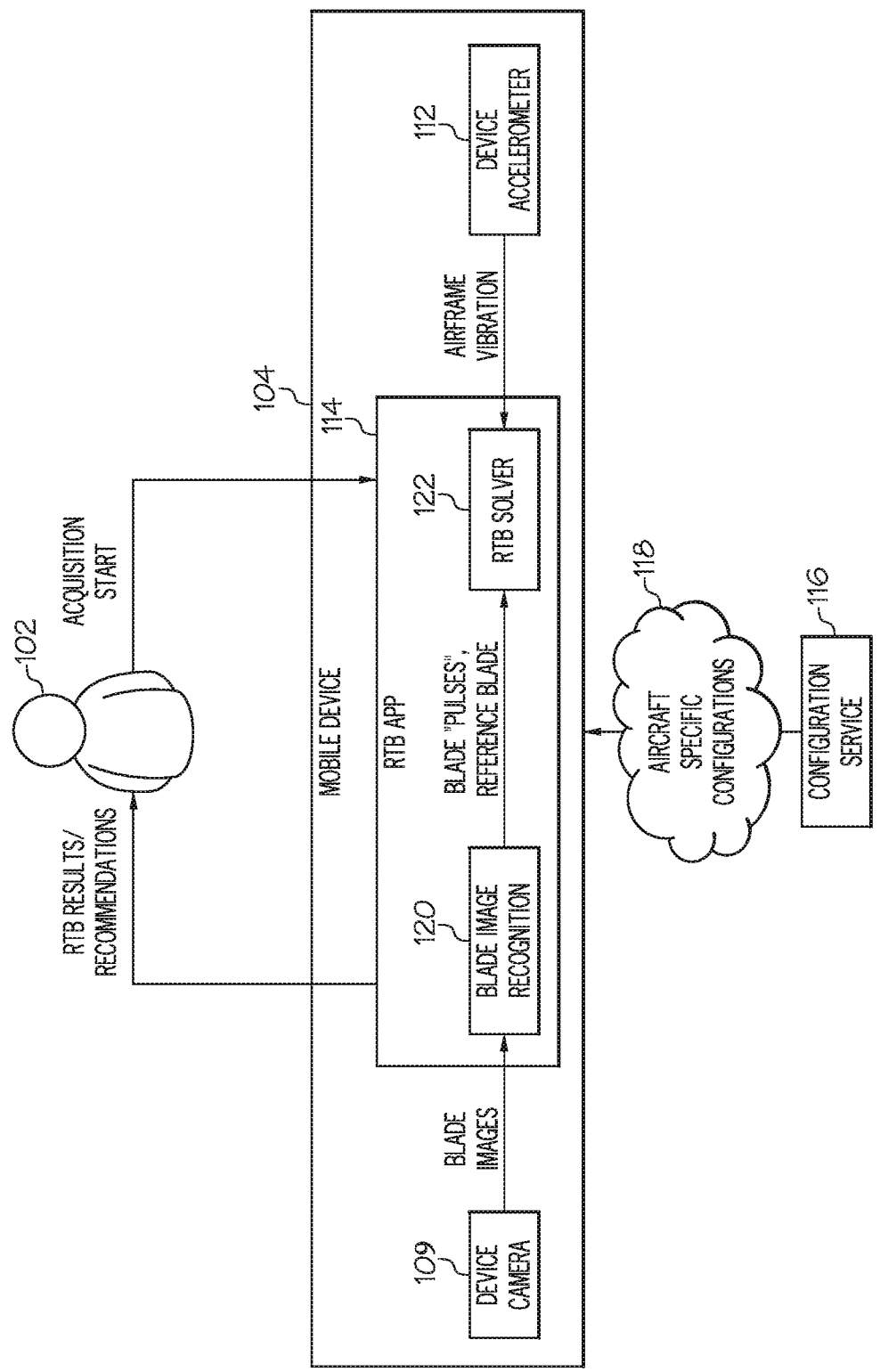
FIG. 8 is a diagram schematically illustrating an exemplary system utilizing a handheld mobile device for implementing various systems and processes, according one or more embodiments shown and described herein.

Turning to FIG. 8, a schematic view is depicted of a system utilizing a handheld mobile device, which may be employed by the embodiment of FIG. 7. The occupant 102 may utilize the handheld mobile device 104 to request RTB data pertaining to the aircraft. The handheld mobile device 104 may utilize its own accelerometer module 112 to detect airframe vibration frequency and/or intensity. The accelerometer module 112 may provide the vibration data to the RTB application 114 internally within the handheld mobile device 104.

The handheld mobile device 104 may also utilize its own device camera 109 to track raw blade height and position data. The device camera 109 may provide the raw blade height and position data to a blade image recognition program 120 within the RTB application 114. The blade image recognition program 120 may utilize any suitable image processing/recognition techniques to track one or more of the blades. The blade image recognition program 120 may then transmit, within the RTB application 114, the blade pulse and reference blade data to the RTB solver. The configuration service 116 may also provide aircraft-specific configuration 118 to the handheld mobile device 104, the RTB application 114, and/or the RTB solver 122. The RTB solver 122 may utilize output received from the tracker module 108, the accelerometer module 112, and/or the configuration service 116 to calculate RTB results and/or recommendations. Based upon the results provided by the RTB solver 122, the RTB application 114 may send RTB results and/or RTB recommendations to the occupant 102.

Figure 9:
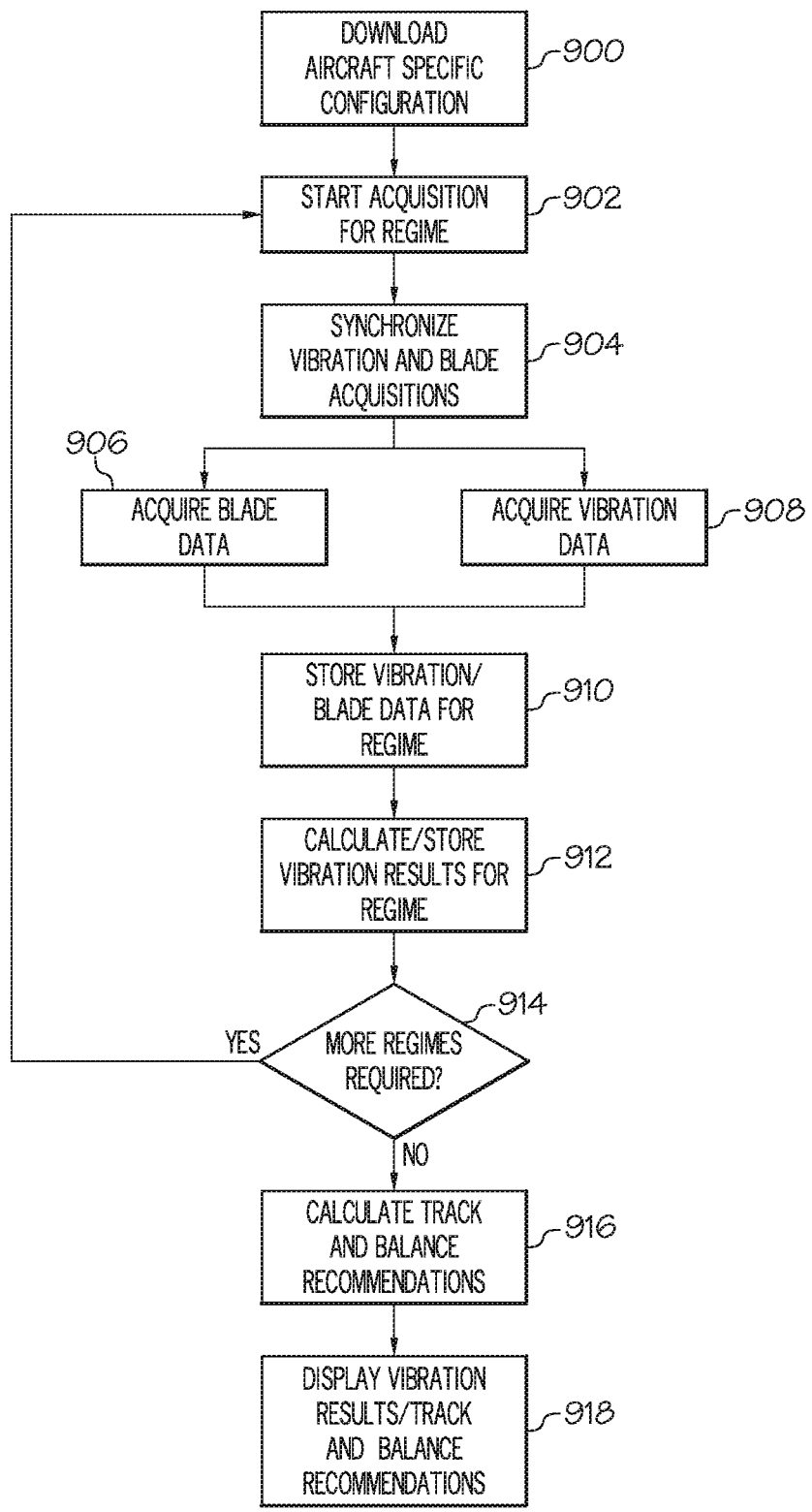
FIG. 9 illustrates a flowchart for determining track and balance recommendations on a handheld mobile device, according to one or more embodiments described and illustrated herein.

Turning to FIG. 9, a flowchart for determining track and balance recommendations on a handheld mobile device is presented. The first operation in the RTB process at step 900 may be to ensure that the app is properly configured with an aircraft specific configuration, which defines the aircraft variable parameters used in RTB calculations. This may be achieved by downloading the aircraft configuration, such as from a cloud-based distribution service (e.g., by transmitting the aircraft specific configuration 118 from the configuration service 116 to the handheld mobile device 104 as described above with respect to FIGS. 2, 4, 6, and 8). Once the RTB app is prepared, the aircraft may be flown with the system installed.

At step 902, regime acquisition may begin, such that RTB data may be collected over multiple flight regimes, with the collection initiated by the operator once they have confirmed that the aircraft is operating in the specified flight regime. At step 904, vibration and blade acquisitions may be synchronized. For example, when an acquisition is initiated, the system ensures that individual components are synchronized. Once synchronization has been confirmed, the RTB application may simultaneously acquire blade positions and vibration data at steps 906 and at 908, respectively. For example, where the accelerometer module 112 and/or tracker module 108 are remote from the handheld mobile device 104, this synchronization may be achieved over a wireless link. Where the handheld mobile device 104 internal sensors (accelerometer module 112 and/or tracker module 108) are utilized, mechanisms provided by the handheld mobile device's computing platform are used. At step 906, blade data may be acquired. At step 908, the acquisition of vibration data may include the detection of the relative position of the leading and trailing edges of each blade, to determine blade track height and lead/lag, and/or the identification of a reference blade, which may be used to identify the remaining blades. Where the device camera is used (e.g., in the embodiments shown in FIGS. 5-8), image recognition software may be used to detect a unique feature of the image associated with the reference blade. Where a remote blade camera (such as a tracker module 108 as shown and described in FIGS. 1-4) is used, the blade camera produces a unique signal for the reference blade resulting from the detection of a unique feature of that blade. By automatically identifying the reference blade in the manner described herein, in some embodiments a separate tachometer may not be needed to effectuate reference blade identification. In other embodiments, a tachometer module (such as an optical tachometer), which may be wireless or wired, may be affixed to the aircraft for blade tracking.

At step 910, raw vibration data, acquired via a device accelerometer or an accelerometer module, may be stored on the mobile device along with the blade data. At step 912, once the blade pass frequency is determined from the reference blade digital, signal processing may be employed to determine the level of rotor induced vibration in the current flight regime at one or more harmonics of the blade frequency, and a determination may be made as to whether more regimes are required. At step 914, if more data from further flight regimes is required (YES at step 914), the flowchart may return to step 902 until the aircraft has flown all required regimes and collected data in each regime. Otherwise, if data for all required regimes has been collected (NO at step 914), the system may move on to step 916 to calculate balance recommendations and make associated predictions regarding reduced vibration levels. Recommended corrections may include, for example, placing weight on the rotor hub at specific locations and/or sweeping the rotor blades (i.e., moving the blade forward or aft of its angular position), adjustments to the rotor pitch change links (PCL), which controls the angle of each rotor blade individually. Continuing with this non-limiting example, the PCL for a particular blade may be lengthened or shortened to move the blade up or down. Another adjustment may be the rotor trim tab. To make a blade fly higher or lower, a trim tab may be recommended to be raised or lowered.

At step 918, upon request (such as from the occupant), RTB vibration measurements and balance recommendations may be displayed, such as to the occupant. In some embodiments, the vibration measurements and balance recommendations are displayed on a display of the handheld mobile device 104. For example, lateral vibration measurements obtained while hovering and a recommendation to sweep the blades aft or forward may be displayed in combination with vertical vibration measurements also obtained while hovering with a recommendation to lengthen or shorten the PCL to correspondingly modify blade angle. In other embodiments, RTB vibration measurements and balance recommendations may be automatically displayed.

Turning to FIG. 10, a block diagram illustrates an exemplary computing device 1000 through which embodiments of the disclosure can be implemented, such as in each of the tracker module 108, the accelerometer module 112, and the handheld mobile device 104. The computing device 1000 described herein is but one example of a suitable computing device and does not suggest any limitation on the scope of any embodiments presented. Nothing illustrated or described with respect to the computing device 1000 should be interpreted as being required or as creating any type of dependency with respect to any element or plurality of elements. In various embodiments, a computing device 1000 may include, but need not be limited to, a laptop, server, client, tablet, smartphone, or any other type of device that can utilize data. A computing device 1000 may correspond to the handheld mobile device described herein. In an embodiment, the computing device 1000 includes at least one processor 1002 and memory (non-volatile memory 1008 and/or volatile memory 1010). The computing device 1000 may include non-volatile memory 1008 (ROM, flash memory, etc.), volatile memory 1010 (RAM, etc.), or a combination thereof. In some embodiments, the at least one processor 1002 is coupled to the non-volatile memory 1008 and/or volatile memory 1010. The computing device 1000 may utilize, by way of non-limiting example, RAM, ROM, cache, fiber optics, EPROM/Flash memory, CD/DVD/BD-ROM, hard disk drives, solid-state storage, optical or magnetic storage devices, diskettes, electrical connections having a wire, any system or device that is of a magnetic, optical, semiconductor, or electronic type, or any combination thereof.

The computing device 1000 can include one or more displays and/or output devices 1004 such as monitors, speakers, headphones, projectors, wearable-displays, holographic displays, and/or printers, for example. This may be utilized, for example, as part of the handheld mobile device 104 with respect to FIG. 1 to display the RTB application 114. The computing device 1000 may further include one or more input devices 1006 which can include, by way of example, any type of mouse, keyboard, disk/media drive, memory stick/thumb-drive, memory card, pen, touch-input device, biometric scanner, sensor, accelerometer, voice/auditory input device, motion-detector, camera, scale, etc. As depicted in FIG. 8, the handheld mobile device 104 may include a device camera 109 and/or an accelerometer module 112.

A network interface/communication module 1012 can facilitate communications over a network 1014 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM. The computing device 1000 may include one or more communication devices 1008 to facilitate communication with one or more remote devices, which may include, for example, client and/or server devices. The network interface/communication module 1012 can be communicatively coupled to any device capable of transmitting and/or receiving data via the network 1014. Accordingly, the network interface/communication module 1012 can include a communication transceiver for sending and/or receiving any wired or wireless communication. For example, the network interface/communication module 1012 may include an antenna, a modem, LAN port, Wi-Fi card, WiMax card, mobile communications hardware, near-field communication hardware, satellite communication hardware and/or any wired or wireless hardware for communicating with other networks and/or devices.

A computer-readable medium 1016 may comprise a plurality of computer readable mediums, each of which may be either a computer readable storage medium or a computer readable signal medium. A computer readable medium 1016 may reside, for example, within an input device 1006, non-volatile memory 1008, volatile memory 1010, or any combination thereof. A computer readable storage medium can include tangible media that is able to store instructions associated with, or used by, a device or system. A computer readable storage medium includes, by way of non-limiting examples: RAM, ROM, cache, fiber optics, EPROM/Flash memory, CD/DVD/BD-ROM, hard disk drives, solid-state storage, optical or magnetic storage devices, diskettes, electrical connections having a wire, or any combination thereof. A computer readable storage medium may also include, for example, a system or device that is of a magnetic, optical, semiconductor, or electronic type. Computer readable storage media are non-transitory, and exclude propagated signals and carrier waves.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

Further aspects of the invention are provided by the subject matter of the following clauses:

A handheld mobile device configured for use within a cockpit of an aircraft, comprising: a display; a memory comprising an application configured to utilize the display; a processor coupled to the memory, wherein the application, via the processor, is configured to: receive aircraft-specific configuration data; receive, from a tracker module, input data corresponding to blade height and position; receive airframe vibration data from an accelerometer module; calculate recommendations regarding track and balance; and output, via the display, the track and balance recommendations.

The handheld mobile device of any preceding clause, wherein: the input data is configured to be received wirelessly from the tracker module; and the tracker module is a physical device affixed to a location within the cockpit physically separate from the handheld mobile device.

The handheld mobile device of any preceding clause, wherein: the airframe vibration data is configured to be received wirelessly from the accelerometer module; and the accelerometer module is a physical device affixed to a location within the cockpit physically separate from the handheld mobile device.

The handheld mobile device of any preceding clause, wherein: the input data is configured to be received wirelessly from the tracker module; the tracker module is a physical device affixed to a location within the cockpit physically separate from the handheld mobile device; the airframe vibration data is configured to be received wirelessly from the accelerometer module; the accelerometer module is a physical device affixed to a location within the cockpit physically separate from the handheld mobile device; and the tracker module is physically separate from the accelerometer module.

The handheld mobile device of any preceding clause, wherein the application further comprises a blade recognition component configured to process blade track data utilizing image recognition and output a result to an RTB (Rotor Track & Balance) solver.

The handheld mobile device of any preceding clause, wherein the RTB solver is configured to analyze the processed blade track data; compare the processed blade track data to the configuration data; and calculate track and balance recommendations based upon the comparison.

An aircraft comprising: the cockpit or the cabin; and the handheld mobile device of any preceding clause, wherein the handheld mobile device is affixed to a portion of the cockpit or the cabin.

The aircraft of any preceding clause, wherein the handheld mobile device if affixed to a transparent, external portion of the cockpit or the cabin.

A system configured for use within a cockpit or cabin of an aircraft, the system comprising: a handheld mobile device comprising: a display; a memory comprising an application; and a processor coupled to the memory, wherein the processor is configured to execute the application to: receive aircraft-specific configuration data; receive, from a tracker module, input data corresponding to blade height and position; receive airframe vibration data from an accelerometer module; calculate recommendations regarding track and balance; and output, via the display, the track and balance recommendations; the tracker module comprising a camera, the tracker module being configured to: utilize the camera to generate input data corresponding to blade height and position; and output the input data to the handheld mobile device; the accelerometer module, comprising an accelerometer, and being configured to: utilize the accelerometer to generate airframe vibration data; and output the airframe vibration data to the handheld mobile device; and a configuration service configured to output, to the handheld mobile device, the aircraft-specific configuration data.

The system of any preceding clause, wherein the handheld mobile device is affixed to a portion of the cockpit or the cabin.

The system of any preceding clause, wherein the handheld mobile device is affixed to a transparent, external portion of the cockpit or the cabin.

The system of any preceding clause, wherein: the input data is configured to be received wirelessly from the tracker module; and the tracker module is a physical device affixed to a location within the cockpit or the cabin physically separate from the handheld mobile device.

The system of any preceding clause, wherein: the airframe vibration data is configured to be received wirelessly from the accelerometer module; and the accelerometer module is a physical device affixed to a location within the cockpit or the cabin physically separate from the handheld mobile device.

The system of any preceding clause, wherein: the tracker module is a physical device affixed to a transparent external surface of the cockpit or cabin at a location within the aircraft cockpit or cabin physically separate from the handheld mobile device; the accelerometer module is a physical device affixed to a location within the cockpit or cabin physically separate from the handheld mobile device; and the tracker module is physically separate from the accelerometer module.

The system of any preceding clause, wherein the application further comprises a blade recognition component configured to process blade track data utilizing image recognition and output a result to an RTB (Rotor Track & Balance) solver.

The system of any preceding clause, wherein the RTB solver is configured to: analyze the processed blade track data; compare the processed blade track data to the configuration data; and calculate track and balance recommendations based upon the comparison.

A method utilizing a handheld mobile device in an aircraft cockpit or cabin, comprising: accessing an application on the handheld mobile device; utilizing the application to download aircraft-specific configuration data; starting data acquisition for a regime; synchronizing vibration and blade acquisitions; acquiring blade and vibration data; storing vibration and blade data for the regime; calculating and storing vibration results for the regime; calculating track and balance recommendations; and displaying vibration results, track recommendations, and balance recommendations on the handheld mobile device.

The method of any preceding clause, wherein calculating the track and balance recommendations is based upon more regimes not being required.

The method of any preceding clause, wherein acquiring blade and vibration data further comprises: analyzing processed blade track data; comparing the analyzed blade track data to the configuration data and the acquired vibration data; and calculating track and balance recommendations based upon the comparison.

The method of any preceding clause, further comprising affixing the handheld mobile device to a transparent, external portion of the aircraft cockpit or cabin.

What is claimed is:

1. A handheld mobile device configured for use within a cockpit or cabin of an aircraft, comprising:
   a display;
   a memory comprising an application configured to utilize the display, wherein the application further comprises a blade recognition component configured to process blade track data of a plurality of blades by utilizing image recognition and output a result to an RTB (Rotor Track & Balance) solver;
   a processor coupled to the memory, wherein the application, via the processor, is configured to:
   receive aircraft-specific configuration data;
   receive, from a tracker module, input data corresponding to blade height and position;
   receive airframe vibration data from an accelerometer module;
   synchronize the data corresponding to blade height and position and the airframe vibration data;
   identify one blade of the plurality of blades as a reference blade by identifying a difference in blade pulses;
   determine a rotational speed of the plurality of blades based on the reference blade;
   calculate recommendations regarding track and balance, wherein the RTB solver is configured to:
   analyze the processed blade track data;

compare the processed blade track data to the configuration data; and
calculate track and balance recommendations based upon the comparison; and
output, via the display, the track and balance recommendations.

2. An aircraft comprising:
the cockpit, the cabin, or both; and
the handheld mobile device of claim 1, wherein the handheld mobile device is affixed to a portion of the cockpit or the cabin.

3. The aircraft of claim 2, wherein the handheld mobile device is affixed to a transparent, external portion of the cockpit or the cabin.

4. The handheld mobile device of claim 1, wherein:
the input data is configured to be received wirelessly from the tracker module; and
the tracker module is a physical device affixed to a location within the cockpit or the cabin physically separate from the handheld mobile device.

5. The handheld mobile device of claim 1, wherein:
the airframe vibration data is configured to be received wirelessly from the accelerometer module; and
the accelerometer module is a physical device affixed to a location within the cockpit or cabin physically separate from the handheld mobile device.

6. The handheld mobile device of claim 1, wherein:
the input data is configured to be received wirelessly from the tracker module;
the tracker module is a physical device affixed to a location within the cockpit or cabin physically separate from the handheld mobile device;
the airframe vibration data is configured to be received wirelessly from the accelerometer module;
the accelerometer module is a physical device affixed to a location within the cockpit or cabin physically separate from the handheld mobile device; and
the tracker module is physically separate from the accelerometer module.

7. A system configured for use within a cockpit or cabin of an aircraft, the system comprising:
a handheld mobile device comprising:
a display;
a memory comprising an application having a blade recognition component configured to process blade track data of a plurality of blades by utilizing image recognition and output a result to an RTB (Rotor Track & Balance) solver; and
a processor coupled to the memory, wherein the processor is configured to execute the application to:
receive aircraft-specific configuration data;
receive, from a tracker module, input data corresponding to blade height and position;
receive airframe vibration data from an accelerometer module;
synchronize the data corresponding to blade height and position and the airframe vibration data;
identify one blade of the plurality of blades as a reference blade by identifying a difference in blade pulses;
determine a rotational speed of the plurality of blades based on the reference blade;
calculate recommendations regarding track and balance, wherein the RTB solver is configured to:
analyze the processed blade track data;
compare the processed blade track data to the configuration data; and
calculate track and balance recommendations based upon the comparison; and
output, via the display, the track and balance recommendations;
the tracker module comprising a camera, the tracker module being configured to:
utilize the camera to generate input data corresponding to blade height and position; and
output the input data to the handheld mobile device;
the accelerometer module, comprising an accelerometer, and being configured to:
utilize the accelerometer to generate airframe vibration data; and
output the airframe vibration data to the handheld mobile device; and
a configuration service configured to output, to the handheld mobile device, the aircraft-specific configuration data.

8. The system of claim 7 wherein the handheld mobile device is affixed to a portion of the cockpit or cabin.

9. The system of claim 8 wherein the handheld mobile device is affixed to a transparent, external portion of the cockpit or cabin.

10. The system of claim 7 wherein:
the input data is configured to be received wirelessly from the tracker module; and
the tracker module is a physical device affixed to a location within the cockpit or the cabin physically separate from the handheld mobile device.

11. The system of claim 7 wherein:
the airframe vibration data is configured to be received wirelessly from the accelerometer module; and
the accelerometer module is a physical device affixed to a location within the cockpit or the cabin physically separate from the handheld mobile device.

12. The system of claim 7 wherein:
the tracker module is a physical device affixed to a transparent external surface of the cockpit or the cabin at a location within the aircraft cockpit or cabin physically separate from the handheld mobile device;
the accelerometer module is a physical device affixed to a location within the cockpit or the cabin physically separate from the handheld mobile device; and
the tracker module is physically separate from the accelerometer module.

13. A method utilizing a handheld mobile device in an aircraft cockpit or cabin, comprising:
accessing an application on the handheld mobile device;
utilizing the application to download aircraft-specific configuration data;
starting data acquisition for a regime;
synchronizing vibration and blade acquisitions;
acquiring blade and vibration data;
storing vibration and blade data for the regime;
calculating and storing vibration results for the regime;
identifying one blade of a plurality of blades as a reference blade by identifying a difference in blade pulses;
determining a rotational speed of the plurality of blades based on the reference blade;
analyzing processed blade track data;
comparing the analyzed blade track data to the configuration data and the acquired vibration data;
calculating track and balance recommendations based upon the comparison; and
displaying vibration results, track recommendations, and balance recommendations on the handheld mobile device.

14. The method of claim 13, wherein calculating the track and balance recommendations is based upon more regimes not being required.

15. The method of claim 13 further comprising affixing the handheld mobile device to a transparent, external portion of the aircraft cockpit or cabin.

* * * * *